United States Patent
Elsberry

(10) Patent No.: US 7,044,250 B1
(45) Date of Patent: May 16, 2006

(54) DETACHABLE SUSPENSION MOUNTING

(76) Inventor: Jerry R. Elsberry, P.O. Box 1134, Gillette, WY (US) 82717

( * ) Notice: Subject to any disclaimer, the term of this patent is extended or adjusted under 35 U.S.C. 154(b) by 301 days.

(21) Appl. No.: 10/447,439

(22) Filed: May 30, 2003

(51) Int. Cl.
*B62D 61/12* (2006.01)

(52) U.S. Cl. ............... 180/209; 280/149.2; 280/407.1

(58) Field of Classification Search ............ 280/149.2, 280/407.1, 86.5; 180/209, 24.02; 296/35.3
See application file for complete search history.

(56) References Cited

U.S. PATENT DOCUMENTS

| | | | |
|---|---|---|---|
| 1,256,558 A | 2/1918 | Hild | |
| 2,656,196 A * | 10/1953 | Fellabaum | ............... 410/81 |
| 2,751,234 A * | 6/1956 | Couse | ............... 280/30 |
| 3,557,707 A | 1/1971 | Joy | |
| D291,190 S | 8/1987 | Davis | |
| 5,046,756 A * | 9/1991 | Hertrick | ............... 280/86.75 |
| 5,107,772 A | 4/1992 | Viens | |
| 5,749,595 A | 5/1998 | Hoss et al. | |
| 5,957,538 A | 9/1999 | Sullivan | |
| 6,247,713 B1 * | 6/2001 | Konop | ............... 280/86.5 |
| 6,311,993 B1 * | 11/2001 | Hulstein et al. | ............... 280/86.5 |

* cited by examiner

*Primary Examiner*—David R. Dunn

(57) ABSTRACT

A detachable suspension mounting includes a pair of plates each having an upper surface and a lower surface. The upper surface of a first of the plates is fixedly coupled to a bottom side of the trailer. A plurality of securing members selectively secures a second plate of the pair of plates to the first plate such that the upper surface of the second plate is adjacent to the lower surface of the first plate. A suspension is fixedly coupled to the lower surface of the second plate and wheels are rotatably coupled to the suspension.

4 Claims, 3 Drawing Sheets

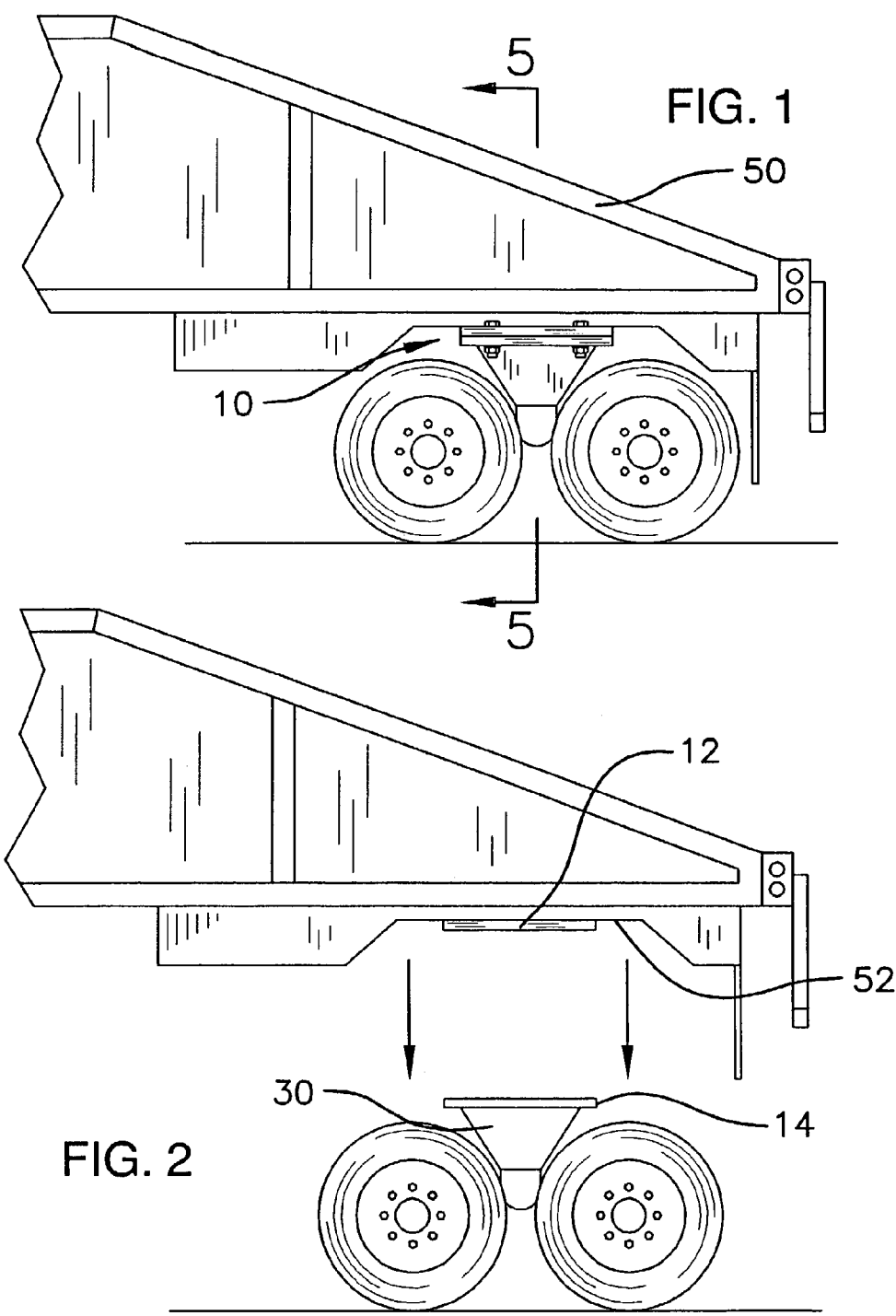

DETACHABLE SUSPENSION MOUNTING

BACKGROUND OF THE INVENTION

Field of the Invention

The present invention relates to suspension mounting systems and more particularly pertains to a new suspension mounting system for allowing the quick replacement of a suspension system from a trailer.

The use of suspension systems are well known and there are even examples in the prior art such as U.S. Pat. No. 5,749,595 to Iloss et al. which describe suspensions for trailers. However, the prior art is devoid of quick release couplers and mountings for trailer suspensions. For this reason, there is a need to provide such a mounting for removing a damaged suspension from a trailer and replacing it with another suspension in an efficient manner.

SUMMARY OF THE INVENTION

The present invention meets the needs presented above by providing a mounting having a suspension attached thereto which can be easily removed from a trailer and quickly replaced with a functioning suspension.

To this end, the present invention generally comprises a pair of plates each having an upper surface and a lower surface. The upper surface of a first of the plates is fixedly coupled to a bottom side of the trailer. A plurality of securing members selectively secures a second plate of the pair of plates to the first plate such that the upper surface of the second plate is adjacent to the lower surface of the first plate. A suspension is fixedly coupled to the lower surface of the second plate and wheels are rotatably coupled to the suspension.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front view of a detachable suspension mounting according to the present invention.

FIG. 2 is a schematic front view of the present invention.

DESCRIPTION OF THE PREFERRED EMBODIMENT

Figure 3:
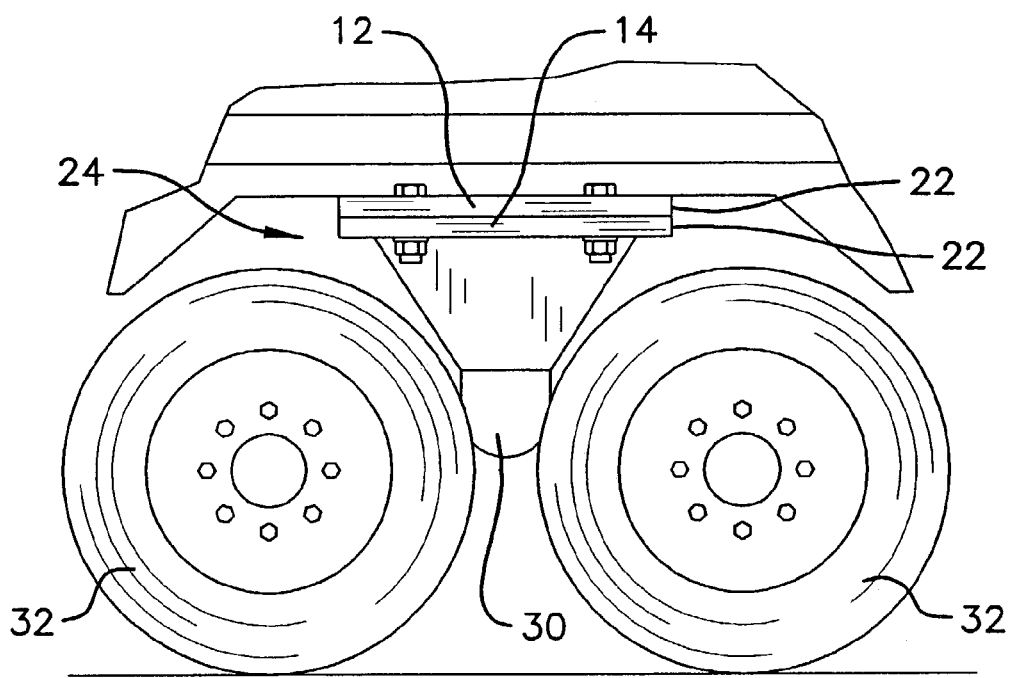
FIG. 3 is a schematic front view of the present invention.
Figure 4:
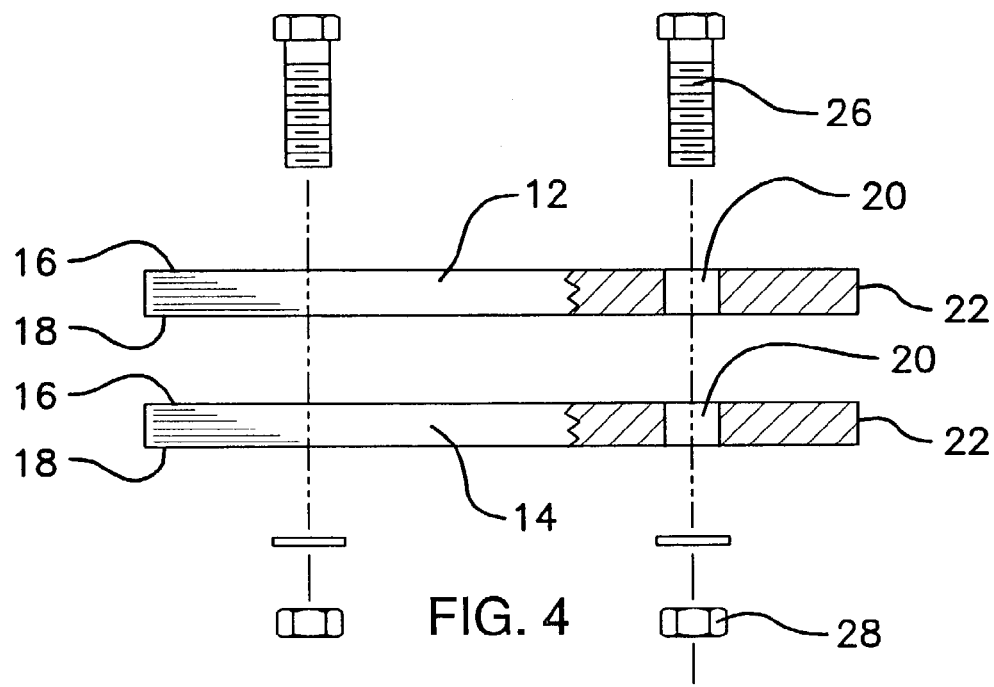
FIG. 4 is a schematic front view of the first and second plates of the present invention.
Figure 5:
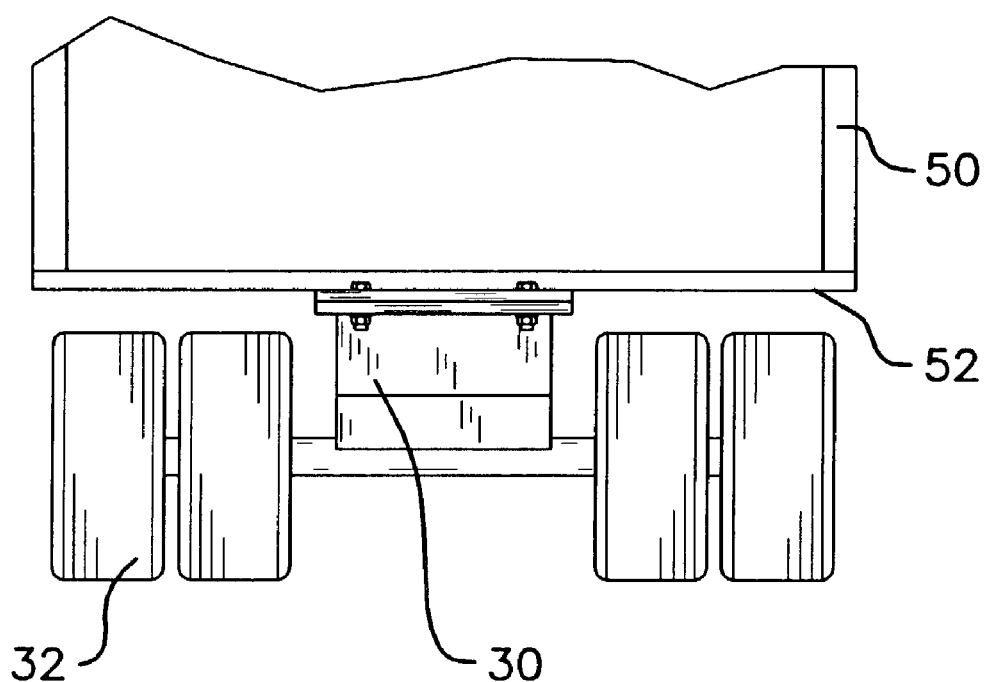
FIG. 5 is a schematic side view of the present invention.

With reference now to the drawings, and in particular to FIGS. 1 through 5 thereof, a new suspension mounting system 10 embodying the principles and concepts of the present invention and generally designated by the reference numeral 10 will be described.

As best illustrated in FIGS. 1 through 5, the detachable suspension mounting 10 generally comprises a pair of plates 12, 14. Each of the plates 12, 14 has an upper surface 16 and a lower surface 18. The plates 12, 14 have a length greater than about two feet, a width greater than about three feet and a height greater than about ½ inch. Ideally, the plates 12, 14 have a length equal to about three feet, a width equal to about four feet and a height equal to about ¾ inches. Each of the plates 12, 14 comprises a metallic material and is preferably an iron or steel material. The plates 12, 14 each have a plurality of openings 20 therein extending through the upper 16 and lower 18 surfaces. The openings 20 in a first plate 12 of the pair of plates are aligned with the openings 20 in a second plate 14 of the pair of plates when peripheral edges 22 of the first 12 and second 14 plates are aligned. The plurality of openings 20 preferably includes four openings 20 extending through each one of the plates 12, 14. The upper surface 16 of the first plate 12 is fixedly coupled to a bottom side 52 of a trailer 50, preferably by a welding process.

A plurality of securing members 24 selectively secures the second plate 14 to the first plate 12 such that the upper surface 16 of the second plate 14 is adjacent to the lower surface 18 of the first plate 12. Each of the securing members 24 extends through a pair of aligned openings 20 in the first 12 and second 14 plates. Though the securing members 24 may be any type of conventional mechanical fastener, it is preferred that each of the securing members comprises a bolt 26 and nut 28 combination.

A conventional trailer suspension 30 is fixedly coupled to the lower surface 18 of the second plate 14. Wheels 32 are rotatably coupled to the suspension 30.

In use, when the suspension fails in dump belly-type trailer, the trailer becomes inoperable until the suspension is serviced. The invention declared herein allows for the replacement of the suspension by removing any hydraulic hoses from the suspension and releasing the first plate from the second plate. A new suspension, which is already attached to another second plate, is then attached to the trailer. The hoses are re-attached to the new suspension and the trailer is ready to be used again.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A quick-release suspension mounting for a trailer, said mounting comprising:
   a pair of plates, each of said plates having an upper surface and a lower surface, said upper surface of a first of said plates being fixedly coupled to a bottom side of said trailer, each of said plates having a length greater than about two feet, a width greater than about three feet and a height greater than about ½ inch;

a plurality of securing members for selectively securing a second plate of said pair of plates to said first plate such that said upper surface of said second plate is adjacent to said lower surface of said first plate, said securing members extending vertically through said first and second plates, each of securing members consisting of a bolt and a nut; and a suspension being fixedly coupled to said lower surface of said second plate, a plurality of wheels being rotatably coupled to said suspension.

2. The quick-release suspension mounting of claim 1, wherein each of said plates has a plurality of openings therein extending through said upper and lower surfaces, said openings in said first plate being aligned with said openings in said second plate when peripheral edges of said first and second plates are aligned, said securing members extending through aligned pairs of openings.

3. The quick-release suspension mounting of claim 2, wherein said plurality of openings comprises four openings extending through each one of said plates.

4. A quick-release suspension mounting for a trailer, said mounting comprising:

a pair of plates, each of said plates having an upper surface and a lower surface, each of said plates having a length greater than about two feet, a width greater than about three feet and a height greater than about ½ inch, each of said plates comprising a metallic material, each of said plates having a plurality of openings therein extending through said upper and lower surfaces, said openings in a first plate of said pair of plates being aligned with said openings in a second plate of said pair of plates when peripheral edges of said first and second plates are aligned, said plurality of openings being four openings extending through each one of said plates, said upper surface of said first plate being fixedly coupled to a bottom side of said trailer;

a plurality of securing members for selectively securing said second plate to said first plate such that said upper surface of said second plate is adjacent to said lower surface of said first plate, each of said securing members extending vertically through a pair of aligned openings in said first and second plates, each of said securing members comprising a bolt and nut combination; and a suspension being fixedly coupled to said lower surface of said second plate, a plurality of wheels being rotatably coupled to said suspension.

* * * * *